US008838461B2

(12) United States Patent
Beebe et al.

(10) Patent No.: US 8,838,461 B2
(45) Date of Patent: Sep. 16, 2014

(54) ACCESS AND MANAGEMENT OF CROSS-PLATFORM CALENDARS

(75) Inventors: Matthew Earl Beebe, Sunnyvale, CA (US); Matias Duarte, Sunnyvale, CA (US); Tom Kier, Sunnyvale, CA (US); Rich Dellinger, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 853 days.

(21) Appl. No.: 12/472,551

(22) Filed: May 27, 2009

(65) Prior Publication Data

US 2010/0162105 A1      Jun. 24, 2010

Related U.S. Application Data

(60) Provisional application No. 61/139,513, filed on Dec. 19, 2008.

(51) Int. Cl.
*G06Q 10/00* (2012.01)
*G06Q 10/10* (2012.01)

(52) U.S. Cl.
CPC .......... *G06Q 10/109* (2013.01); *G06Q 10/1093* (2013.01)
USPC ........................................................ 705/1.1

(58) Field of Classification Search
CPC ............ G06F 2203/04803; G06F 2203/04806; G06F 3/0482; G06F 3/04886; G06Q 10/109
See application file for complete search history.

(56) References Cited

U.S. PATENT DOCUMENTS

| | | | |
|---|---|---|---|
| 6,243,325 B1 * | 6/2001 | Tomono | 368/28 |
| 2005/0197763 A1 * | 9/2005 | Robbins et al. | 701/200 |
| 2007/0147178 A1 * | 6/2007 | Masuda et al. | 368/29 |
| 2007/0159927 A1 | 7/2007 | Brush et al. | |
| 2007/0168892 A1 * | 7/2007 | Brush et al. | 715/963 |
| 2008/0140488 A1 | 6/2008 | Oral et al. | |
| 2008/0148181 A1 * | 6/2008 | Reyes et al. | 715/801 |
| 2008/0178100 A1 * | 7/2008 | May et al. | 715/764 |
| 2008/0294994 A1 * | 11/2008 | Kruger et al. | 715/733 |
| 2009/0158200 A1 * | 6/2009 | Palahnuk et al. | 715/781 |

FOREIGN PATENT DOCUMENTS

| | | |
|---|---|---|
| CN | 101188001 A | 5/2008 |
| CN | 101197021 A | 6/2008 |
| EP | 1923826 A1 | 5/2008 |
| KR | 10-2006-0125422 A | 12/2006 |
| KR | 10-2008-0004127 A | 1/2008 |

OTHER PUBLICATIONS

Fitzgerald, Michael. "A Tool to Organize Our Many Organizers". The New York Times. Sep. 2, 2007.*
PCT International Search Report and Written Opinion, PCT Application No. PCT/US2009/067780, Jul. 22, 2010, 8 pages.

* cited by examiner

*Primary Examiner* — Gabrielle McCormick
(74) *Attorney, Agent, or Firm* — Mahamedi Paradice LLP

(57) ABSTRACT

A system is disclosed for users to manage calendars in mobile computing devices. The system retrieves calendar entries from multiple calendars of distinct calendar platforms, extracts event information from the retrieved calendar entries, and aggregates extracted event information. The system can simultaneously display calendar entries extracted from multiple calendars of distinct platforms. The system provides various features for users to operate the calendars, such as (1) hiding calendar entries from some calendars and visually distinguishing the time scheduled for the hidden entries from free time; (2) compressing the display of extended free time periods; and enabling users to (3) navigate time as a scrolling list not subject to the limitations of arbitrary calendar units (e.g., month, week).

15 Claims, 15 Drawing Sheets

ACCESS AND MANAGEMENT OF CROSS-PLATFORM CALENDARS

CROSS-REFERENCE TO RELATED APPLICATION

This application claims the benefit of U.S. Provisional Application No. 61/139,513, filed Dec. 19, 2008, the content of which is incorporated by reference herein in its entirety.

BACKGROUND

1. Field of Art

The disclosure generally relates to a calendar application, in particular to a calendar application executable within a computing device.

2. Description of the Related Art

As electronic calendars are becoming commonplace, people increasingly use various calendars to organize their schedules. Often, a user utilizes multiple calendars to manage schedules of multiple roles the user plays in life. For example, a user may keep calendar A for work related matters and calendar B for family or social related matters. One of the calendars may be shared with others, while the other may only be accessible by the user himself.

There are existing applications that enable users to access and view online calendars from mobile computing devices. Some of the applications (e.g., iPHONE CALENDAR) enable a user to synchronize a local calendar on the user's mobile phone with external closed calendar applications such as APPLE MOBILEME and MICROSOFT EXCHANGE. These applications do not support online calendar services such as GOOGLE CALENDAR. These applications also do not support simultaneous display of details from calendars provided across multiple, distinct calendar platforms. In addition, these applications generally do not efficiently utilize the limited display space on mobile phones (e.g., wastefully displaying an extended period of free time with nothing scheduled). As a result, users cannot effectively access and manage calendars using these applications.

Thus, the art lacks, inter alia, a system and method for efficiently accessing and managing calendars within a limited display area of a computing device.

SUMMARY

A disclosed system (and method) includes a calendar system executable within a computing device to allow a user to manage calendars from distinct platforms. In one aspect, a calendar system retrieves calendar entries from different calendars from multiple (two or more), distinct platforms associated with the user. The calendar system extracts event information from the retrieved calendar entries and aggregates the extracted event information. The calendar system displays the aggregated extracted event information in a calendar grid, thereby providing the user with a single view within a single interface of multiple calendars from distinct platforms.

According to one aspect, the calendar system selectively displays calendar entries extracted from one calendar and not those from the other calendars associated with the user. The calendar system displays sections of the calendar grid corresponding to time periods scheduled for undisplayed calendar entries in a pattern that is visually distinctive from those corresponding to free time.

According to another aspect, the calendar system compresses the display of an extended period of free time to make room for displaying neighboring calendar entries, and provides users with a mechanism to turn on/off the compressed display.

According to yet another aspect, the calendar system enables users to preview detailed schedule information unavailable in a calendar view by expanding the display of a time period of the user's interest and displaying the detailed schedule information of events scheduled in the time period without leaving the calendar view.

According to still another aspect, the calendar system enables users to navigate displayed time as a scrolling list not subject to the limitations of arbitrary calendar units (e.g., month, week, day) and to set a preference to prioritize display of the future or the past.

The disclosed system beneficially provides users with a mechanism to conveniently access and manage calendars provided by multiple, distinct platforms, view additional scheduling information, preview detailed scheduling information without switching calendar views, and navigate displayed time as a scrolling list.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying drawings. The drawings include the Figures described below.

FIGS. 5A-5L are screenshots illustrating various features of a calendar system shown in FIGS. 2 and 3.

DETAILED DESCRIPTION

The Figures (FIGS.) and the following description relate to preferred embodiments by way of illustration only. It should be noted that from the following discussion, alternative embodiments of the structures and methods disclosed will be readily recognized as viable alternatives that may be employed without departing from the principles described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Mobile Computing Device

Figure 1:
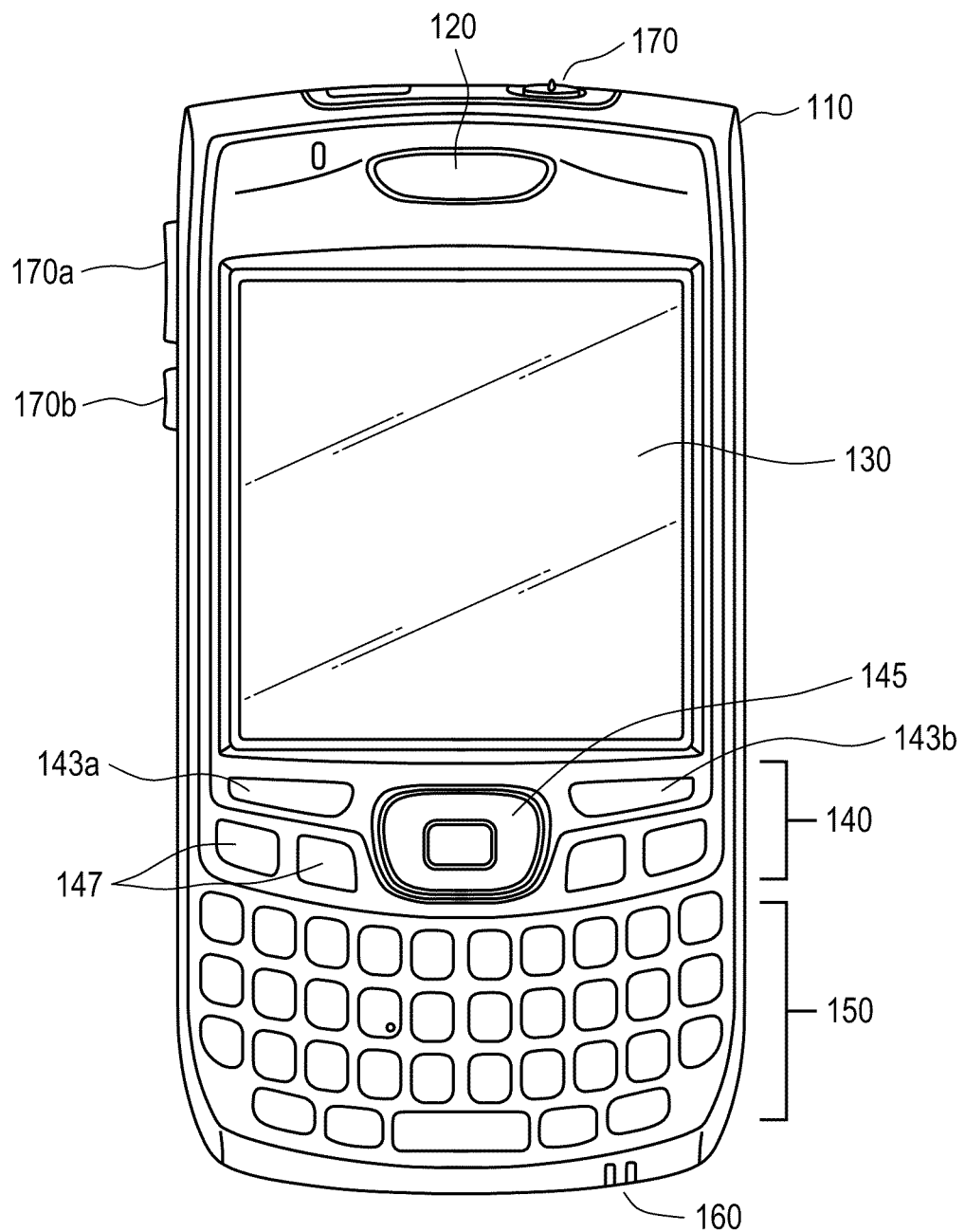
FIG. 1 illustrates one embodiment of a mobile computing device.

FIG. 1 illustrates one embodiment of a mobile computing device 110 with telephonic functionality, e.g., a mobile phone or a smartphone. The mobile computing device is configured to host and execute a phone application for placing and receiving telephone calls. It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) or data networks having voice over internet protocol (VoIP) functionality.

The mobile computing device 110 is configured to be of a form factor that is convenient to hold in a user's hand, for example, a personal digital assistant (PDA) or a smartphone form factor. For example, the mobile computing device 110 can have dimensions ranging from 6.0 to 16.0 centimeters in length, 5.0 to 15.0 centimeters in width, 0.5 to 2.5 centimeters in height and weigh between 50 and 250 grams.

The mobile computing device 110 includes a speaker 120, a screen 130, a navigation area 140, a keypad area 150, and a microphone 160. The mobile computing device 110 also may include one or more switches 170, 170a, 170b (generally 170). The one or more switches 170 may be buttons, sliders, or rocker switches and can be mechanical or solid state (e.g., touch sensitive solid state switch).

The screen 130 of the mobile computing device 110 is, for example, a 240×240, a 320×320, or a 320×480 transflective display. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The navigation area 140 is configured to control functions of an application executing in the mobile computing device 110 and visible through the screen 130. For example, the navigation area includes an x-way (x is a numerical integer, e.g., 5) navigation ring 145 that provides cursor control, selection, and similar functionality. In addition, the navigation area 140 may include selection buttons 143a, 143b to select functions viewed just above the buttons on the screen 130. In addition, the navigation area 140 also may include dedicated function buttons 147 for functions such as, for example, a calendar, a web browser, an e-mail client or a home screen. In this example, the navigation ring 145 may be implemented through mechanical, solid state switches, dials, or a combination thereof. The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards), which may include memory cards such as COMPACTFLASH™ cards, SD cards, XD cards, MEMORY STICK™, MULTIMEDIACARD™, SDIO, and the like.

Example Mobile Computing Device Architectural Overview

Figure 2:
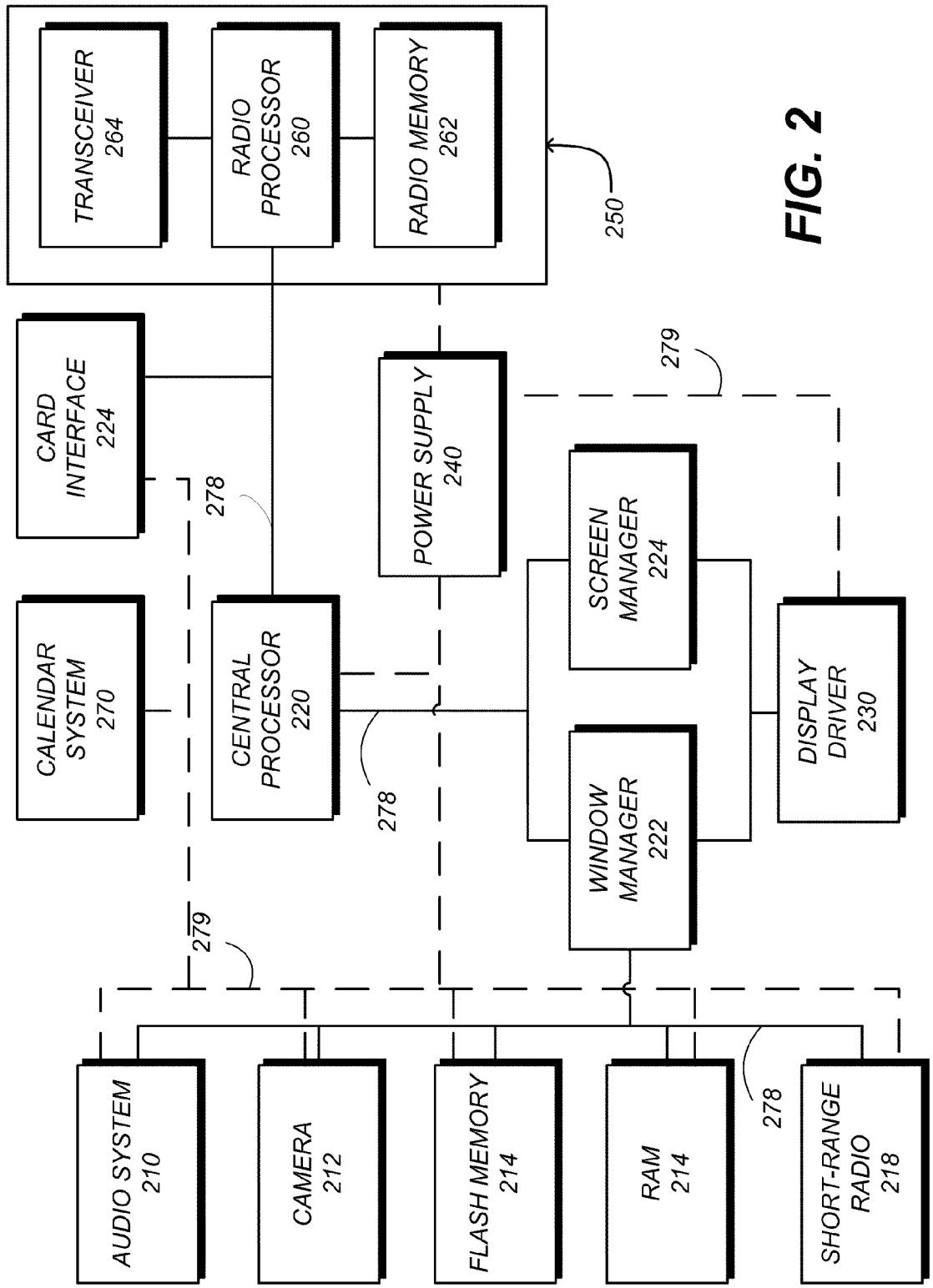
FIG. 2 illustrates one embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIG. 1. The mobile computing device 110 includes a central processor 220, a power supply 240, and a radio subsystem 250. The central processor 220 communicates with: an audio system 210, a camera 212, flash memory 214, RAM memory 216, a short range radio module 218 (e.g., BLUETOOTH, wireless fidelity (WiFi) component), a calendar system 270, a card interface 224, a window manager 222 and a screen manager 226. The central processor 220 communicatively couples these various components or modules through a data line (or bus) 278. The power supply 240 powers the central processor 220, the radio subsystem 250 and a display driver 230 (which may be contact- or inductive-sensitive). The power supply 240 may correspond to a direct current source (e.g., a battery pack, including rechargeable) or an alternating current (AC) source. The power supply 240 powers the various components through a power line (or bus) 279.

In one embodiment, the window manager 222 comprises a software or firmware process that initializes a virtual display space stored in the RAM 216 and/or the flash memory 214. The virtual display space includes one or more applications currently being executed by a user and the current status of the executed applications. The window manager 222 receives requests, from user input or from software or firmware processes, to show a window and determines the initial position of the requested window. Additionally, the window manager 222 receives commands or instructions to modify a window, such as resizing the window, moving the window or any other command altering the appearance or position of the window, and modifies the window accordingly.

The screen manager 226 comprises a software or firmware process that manages content displayed on the screen 130. In one embodiment, the screen manager 226 monitors and controls the physical location of data displayed on the screen 130 and which data is displayed on the screen 130. The screen manager 226 alters or updates the location of data as viewed on the screen 130. The alteration or update is responsive to input from the central processor 220 and display driver 230, which modifies appearances displayed on the screen 130. In one embodiment, the screen manager 226 also monitors and controls screen brightness and transmits control signals to the central processor 220 to modify screen brightness and power usage of the screen 130.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120. The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include a Global System of Mobile (GSM) communication system, a Code Division, Multiple Access (CDMA) system, and a Universal Mobile Telecommunications System (UMTS). Examples of data networks include General Packet Radio Service (GPRS), third-generation (3G) mobile, High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using the data line (or bus) 278.

The card interface 224 is adapted to communicate with the expansion slot. The card interface 224 transmits data and/or instructions between the central processor and an expansion card or media card included in the expansion slot. The card interface 224 also transmits control signals from the central processor 220 to the expansion slot to configure an expansion card or media card included in the expansion slot.

The calendar system 270 comprises a software or firmware process that manages one or more calendars associated with a user. The software or firmware includes programming code or instructions stored in a computer readable storage medium (e.g., the flash memory 214 or the RAM 216) and executable by a processor (e.g., the central processor 220). In one embodiment, the associated calendars may be from distinct calendar platforms. For example, a user may have calendars hosted by distinct online calendar platforms (or services, systems) (e.g., GOOGLE CALENDAR, YAHOO! CALENDAR, etc.). The user may also have calendars provided by proprietary calendar platforms (e.g., MICROSOFT EXCHANGE SERVER). The calendar system 270 is configured to retrieve calendar entries from these associated calendars, extract event information from the calendar entries, and aggregate the event information for user access. The calendar system 270 is configured to display scheduling information across distinct calendars and/or calendar platforms, thereby enabling the user to conveniently access and manage all of the user's calendar entry data within a single displayed result.

In one embodiment, the central processor 220 executes logic (by way of programming, code, instructions) corresponding to executing applications interfaced through, for example, the navigation area 140 or switches 170. It is noted that numerous other components and variations are possible for the hardware architecture of the computing device 110, thus an embodiment such as shown by FIG. 2 is just illustrative of one implementation for an embodiment.

Example Architecture of Calendar System

Figure 3:
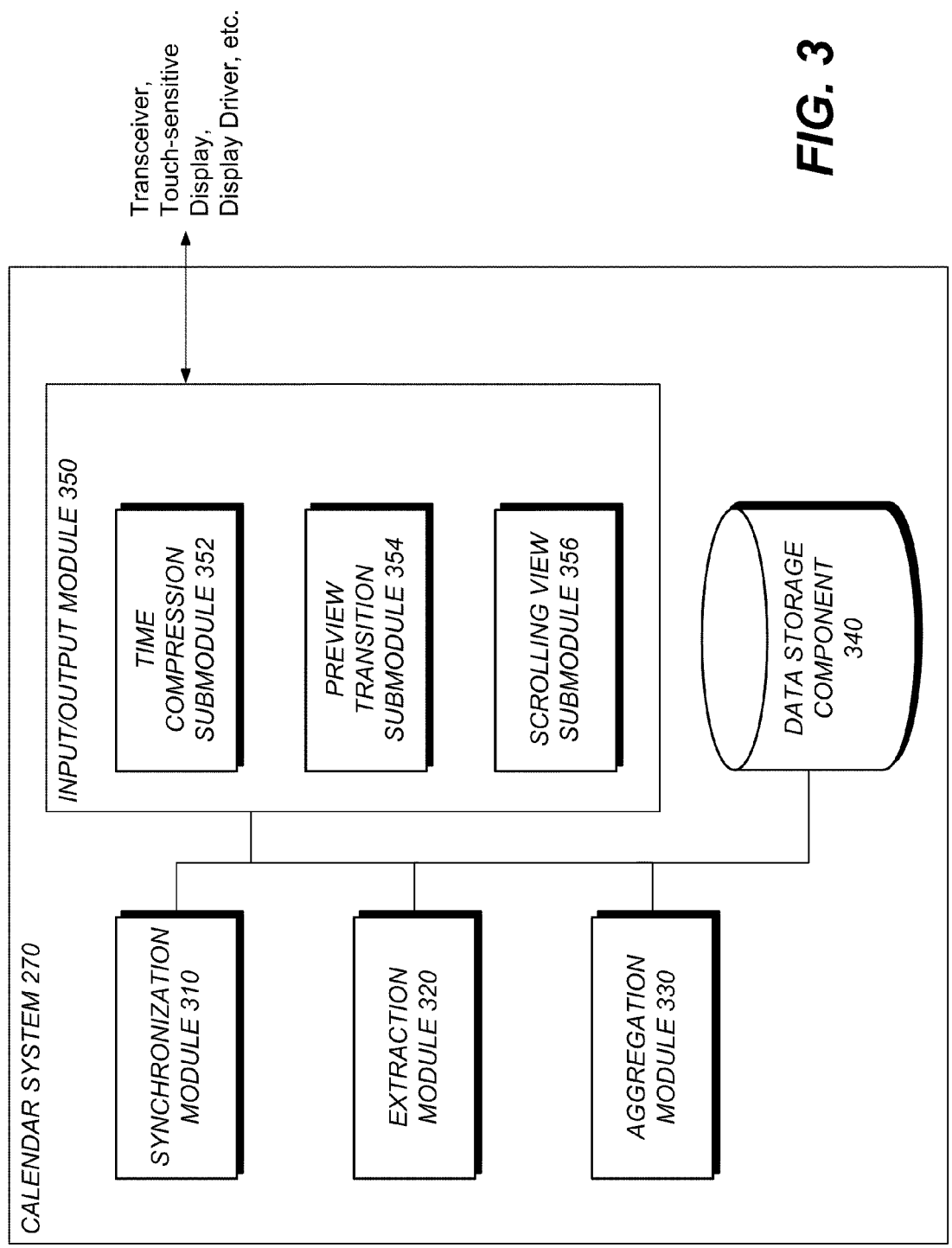
FIG. 3 illustrates one embodiment of an architecture of a calendar system shown in FIG. 2.

Referring next to FIG. 3, a block diagram illustrates one embodiment of an architecture of a calendar system 270. By way of example, the architecture illustrated in FIG. 3 will be described with respect to the device architecture of FIG. 2 and the mobile computing device of FIG. 1. As illustrated, the calendar system 270 includes the following interconnected components: a synchronization module 310, an extraction module 320, an aggregation module 330, an input/output module (hereinafter referred to as I/O module) 350, and a data storage component 340. Each of the modules (or submodules, components) comprises software or firmware. The software or firmware includes instructions storable in a computer readable storage medium and executable by a processor (e.g., the central processor 220). Those of skill in the art will recognize that other embodiments can have different and/or additional modules than those shown in FIG. 3 while operating within the constructs described herein. Likewise, the functionalities can be distributed among the modules in a manner different than described herein also while operating within the constructs described herein.

The synchronization module 310 is configured for synchronizing the calendar system 270 with calendars associated with a particular user. The calendars may be distinct and may include calendars provided by online calendar platforms (or services, systems, service providers), such as GOOGLE CALENDAR, YAHOO! CALENDAR, MYSPACE CALENDAR, FACEBOOK CALENDAR, or other online calendar services that the user considers personal and typically requires some forms of authentication for access (e.g., requiring a user identification (ID) and a password). The calendar service also may be provided by a proprietary calendar platform such as MICROSOFT EXCHANGE SERVER. Further, in one embodiment, the calendar system 270 is configured to manage calendars hosted at two or more distinct calendar platforms, such as a GOOGLE CALENDAR and a YAHOO! CALENDAR. For ease of discussion, the example embodiments described herein are with reference to two or more distinct and disparate online calendar platforms or proprietary calendar platforms.

In one embodiment, the data storage component 340 includes calendar account information (e.g., calendar platform identity, account name, password) for the associated calendars. The synchronization module 310 is configured to retrieve account information from the data storage component 340, access the associated calendars using the retrieved account information, and synchronize the calendars with a local calendar through the transceiver 264. The synchronization includes retrieving calendar entries from the calendars, and updating the calendars (e.g., creating, modifying, and deleting calendar entries) based on the local calendar and/or user commands. The local calendar is a calendar application executing on the mobile computing device 110. In one embodiment the local calendar resides on the mobile computing device 110. In alternate embodiments the local calendar may partially reside on the mobile computing device 110 and partially on a server, but executes locally. In yet another embodiment the local calendar may reside on the server and download a run-time version to execute on the mobile computing device 110.

Based on user preferences, the capacity of the mobile computing device 110, and/or services provided by the calendars, the synchronization module 310 can be configured to periodically request (e.g., at predetermined time intervals, such as every 15 minutes) the calendar platforms (e.g., a calendar server) for up-to-date calendar entries. Alternatively or in conjunction, the synchronization module 310 can configure the calendar platforms to actively transfer (push) updates to the mobile computing device 110 at predetermined time intervals or occurrence of an event (e.g., explicit command transmitted to a calendar hosting server to synchronize calendar entries immediately).

The extraction module 320 is configured to extract event information from the retrieved calendar entries. Calendar entries retrieved from different calendar platforms (also referred to as sources, calendar sources, platforms, services) have different data formats and different metadata (e.g., category, importance, etc.). As noted previously, the data storage component 340 includes format information of popular calendar platforms such as MICROSOFT EXCHANGE CALENDAR, GOOGLE CALENDAR, YAHOO! CALENDAR, and MYSPACE CALENDAR. The extraction module 320 is configured to extract event information from the calendar entries using format information corresponding to their sources. Examples of the event information include subject (or description), location (or venue), start time, end time, attendees, and recurrent (or repeat) information. The extraction module 320 also adds source identity information to the event information.

The aggregation module 330 is configured to aggregate event information from associated calendars and generate (or update) corresponding calendar entries in the local calendar. As noted previously, in the example embodiment disclosed herein, the associated calendars are from calendar platforms distinct from one another. The aggregation module 330 adjusts scheduled event times before adding into the local calendar. For example, for a person who lives in California and frequently travels to Washington D.C. for business, his personal calendar may be set to Pacific Time while his business calendar may be set to Eastern Time. The aggregation module 330 adjusts the times of the events scheduled in the personal calendar and the business calendar accordingly (e.g., to a local time zone based on a location of the mobile computing device 110). In one embodiment, the aggregation module 330 calculates the recurrences of events scheduled for repeat. In one embodiment, the aggregation module 330 also is configured to check for duplicate events (e.g., by comparing schedule time, location, attendees) and either remove them or provide a user selectable command to remove them. The aggregation module 330 stores the aggregated events in the local calendar.

The I/O module 350 is configured to communicate with online calendar sources, display the local calendar, and receive relevant user inputs (e.g., commands to navigate displayed calendar, commands to create or modify calendar entries). As shown, the I/O module 350 is communicatively connected with the transceiver 264, the touch-sensitive display 130, and the display driver 230. The I/O module 350 (or the synchronization module 310) communicates with online calendar sources through the transceiver 264. The I/O module 350 receives user input through the touch-sensitive display 130 (or keyboards or switches), and displays calendar information through the display driver 230 (or window manager 222 or screen manager 224).

In one embodiment, the I/O module 350 displays a calendar grid for a period of time (e.g., referred to as a calendar view) and events scheduled in the period of time on the screen 130. Users can navigate or manage the local calendar through input mechanisms such as the touch sensitive display of the screen 130 and the navigation ring 145. Users can also set up calendar account information, user preferences, and calendar data format information through the I/O module 350. In one embodiment, the I/O module 350 generates and displays animations to smooth display transitions.

In one embodiment, the I/O module 350 includes submodules configured to provide advanced user functionalities. Examples of such submodules include a time compression submodule 352, a preview transition submodule 354, and a scrolling view submodule 356. The time compression submodule 352 is configured to compress the display of extended periods of free time to make room for displaying neighboring calendar entries. The preview transition submodule 354 is configured to enable users to preview detailed schedule information unavailable in a calendar view by expanding the display of a time period of interest without leaving the calendar view. The scrolling view submodule 356 is configured to enable users to navigate time as a scrolling list not subject to the limitations of arbitrary calendar units (e.g., month, week, day) and to set a preference to prioritize display of the future or the past. The three submodules will be described in further detail below.

The data storage component 340 is configured to store information for the calendar system 270, such as user profiles, calendar account information, the local calendar, and/or user preferences. The data storage component 340 may be a relational database or any other type of database that stores the data, such as a flat file.

Calendar System Operation

Figure 4A:
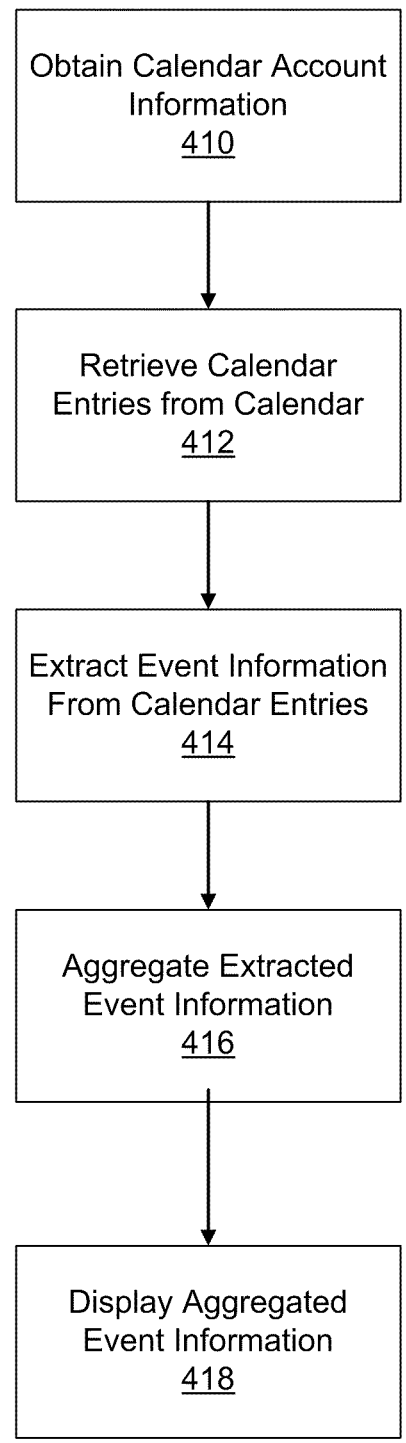
FIGS. 4A-E are flowcharts illustrating operations of a calendar system shown in FIGS. 2 and 3 according to one embodiment.

Referring next to FIG. 4A, a flow diagram illustrating one embodiment of an operation of the calendar system 270 on a mobile computing device 110. By way of example, the operation illustrated in FIG. 4A will be described with respect to the architectures of FIGS. 2 and 3 and the mobile computing device of FIG. 1.

The calendar system 270 obtains 410 calendar account information of one or more associated calendars. In one embodiment, such account information is provided by a user of the mobile computing device 110 and stored in the data storage component 340. The calendar system 270 is configured to retrieve 412 calendar entries from the associated calendars (e.g., through the synchronization module 310). The calendar system 270 supports calendars provided across multiple, distinct platforms (GOOGLE CALENDAR, YAHOO! CALENDAR), each of which may support different mechanisms (e.g., network protocols, remote function calls, Application Programming Interfaces, etc.). When retrieving 412 calendar entries from a calendar source, the calendar system 270 retrieves description information of the supported mechanism from the data storage component 340 and communicates with the source accordingly. The calendar system 270 can be configured to retrieve calendar entries periodically at pre-defined intervals (e.g., continually, every 15 minutes, every time the calendar system 270 is activated, whenever a network service becomes available, etc.) or passively listen to sources for updates (e.g., update calendar entries only when changes from a calendar source are broadcasted or transmitted). In one embodiment, the calendar system 270 retrieves 412 all calendar entries from an online calendar when it is initially setup, and subsequently only retrieves 412 those with updates.

The calendar system 270 is configured to extracts 414 event information from the retrieved calendar entries (e.g., through the extraction module 320). As noted above, calendar entries retrieved from distinct calendar platforms have different data formats and metadata. The calendar system 270 extracts 414 event information (e.g., subject, location, time, attendee, recurrence, importance, and category) from the retrieved calendar entries using format information corresponding to their sources. The event information can be identified and extracted 414 based on their associated tags (e.g., setField tag). Alternatively or additionally, the calendar system 270 identifies event information using pattern recognition technologies (e.g., MM-DD-YYYY for dates) and/or known calendar entry schema/template.

The calendar system 270 is configured to aggregate 416 the extracted event information into a local calendar (also referred to as a master calendar) (e.g., through the aggregation module 330). In one embodiment, the calendar system 270 queries for events from across all associated calendars, processes the events (e.g., adjusts time, populates recurrences), and adds them into (or synchronizes with) the local calendar.

The calendar system 270 displays 418 aggregated event information in the local calendar (e.g., through the I/O module 350). In one embodiment, the calendar system 270 generates a virtual display of schedule events in the local calendar and displays a portion of the virtual display (also referred to as an active window). The user can view rest of the virtual display by navigating the active window on the virtual display. In one embodiment, the calendar system 270 maintains multiple virtual displays for multiple calendar views (e.g., monthly view, weekly view, daily view, etc.). Dimensions of a virtual display are determined based on the associated calendar view and dimensions of the screen 130 of the mobile computing device 110 that is displaying the local calendar. In one embodiment, the width of the virtual display is determined by a width of the screen 130 (e.g., number of horizontal display pixels), and the length of the virtual display is determined by factors such as a length of the screen 130 and the associated calendar view. For example, the virtual display of a daily view may display a schedule of the current day and ten days before and after the current day. The operation of the calendar system 270 illustrated in FIG. 4A can be implemented as computer program instructions recorded on a computer-readable medium (e.g., the flash memory 214 or the RAM 216) and executable by a processor (e.g., the central processor 220).

Figure 5A:
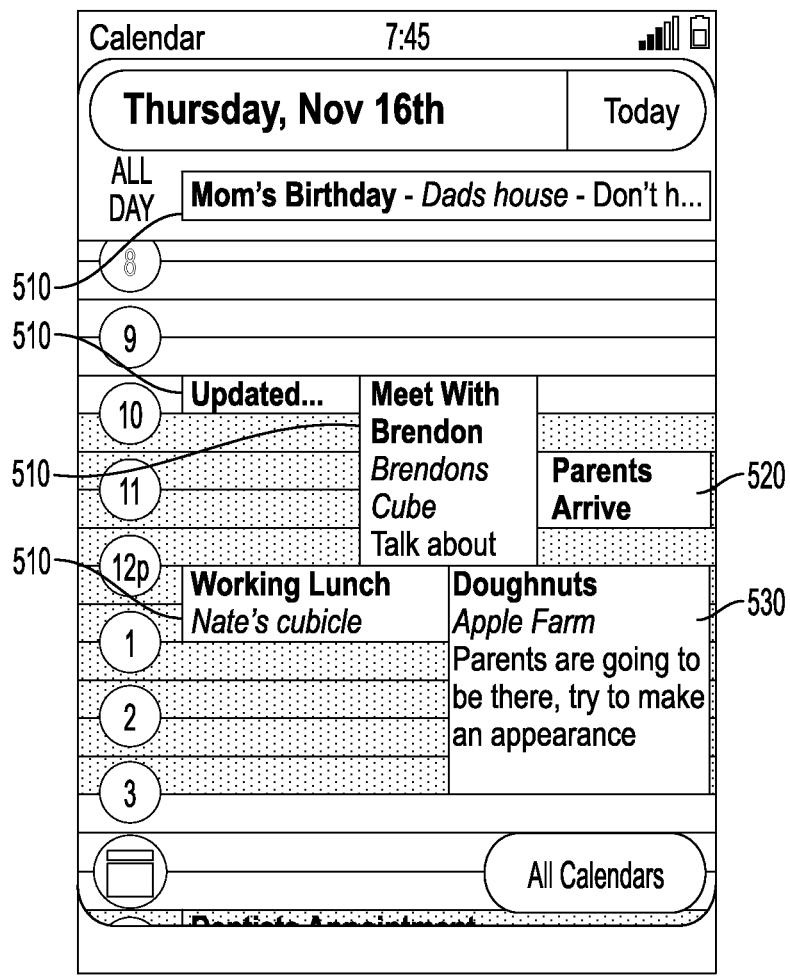

In one embodiment, calendar entries are displayed using distinctive visual features (e.g., color, fill pattern) to identify their attributes. For example, calendar entries can be color coded to reflect their sources. Referring now to FIG. 5A, a screenshot of the calendar system 270 according to one example embodiment. As shown in this example, the calendar system 270 displays calendar entries extracted from all associated calendars, which include a business calendar provided by GOOGLE CALENDAR (also called the GOOGLE calendar), a family calendar provided by YAHOO! CALENDAR (also called the YAHOO! calendar), and a personal calendar hosted by MYSPACE CALENDAR (also called the MYSPACE calendar). There are four events 510 extracted from the GOOGLE calendar, one event 520 from the YAHOO! calendar, and one event 530 from the MYSPACE calendar. As shown, events extracted from distinct calendar platforms are displayed using distinct visual characteristics. Alternatively or in conjunction, different visual characteristics can be associated with events with different attributes (e.g., low/high importance, categories). The user can also assign additional visual characteristic associations as desired.

In one embodiment, the calendar system 270 is configured to enable the user to modify or delete an existing calendar entry, create a calendar entry in one or more associated calendars, and/or move or copy calendar entries among different sources. As will be described in detail below, the calendar system 270 provides users with additional features to view and navigate calendar entries extracted from multiple calendars.

Busy Time Across Calendars

As described above and illustrated in FIG. 5A, the calendar system 270 can display calendar entries extracted from calendars provided across multiple, distinct platforms. In addition, the user can specify that the calendar system 270 only displays calendar entries extracted from one or a subset of associated calendars. In one embodiment, to better inform the user with his agenda, the calendar system 270 visually distinguishes free time (i.e., time periods when no event is scheduled in any of the associated calendars) from undisplayed busy time (i.e., time periods with events scheduled in at least one associated calendar, which may be undisplayed). The calendar system 270 makes the visual distinction by displaying their corresponding sections of the calendar grid using different visual features or characteristics (e.g., colors, gray scales, fill patterns).

Figure 4B:
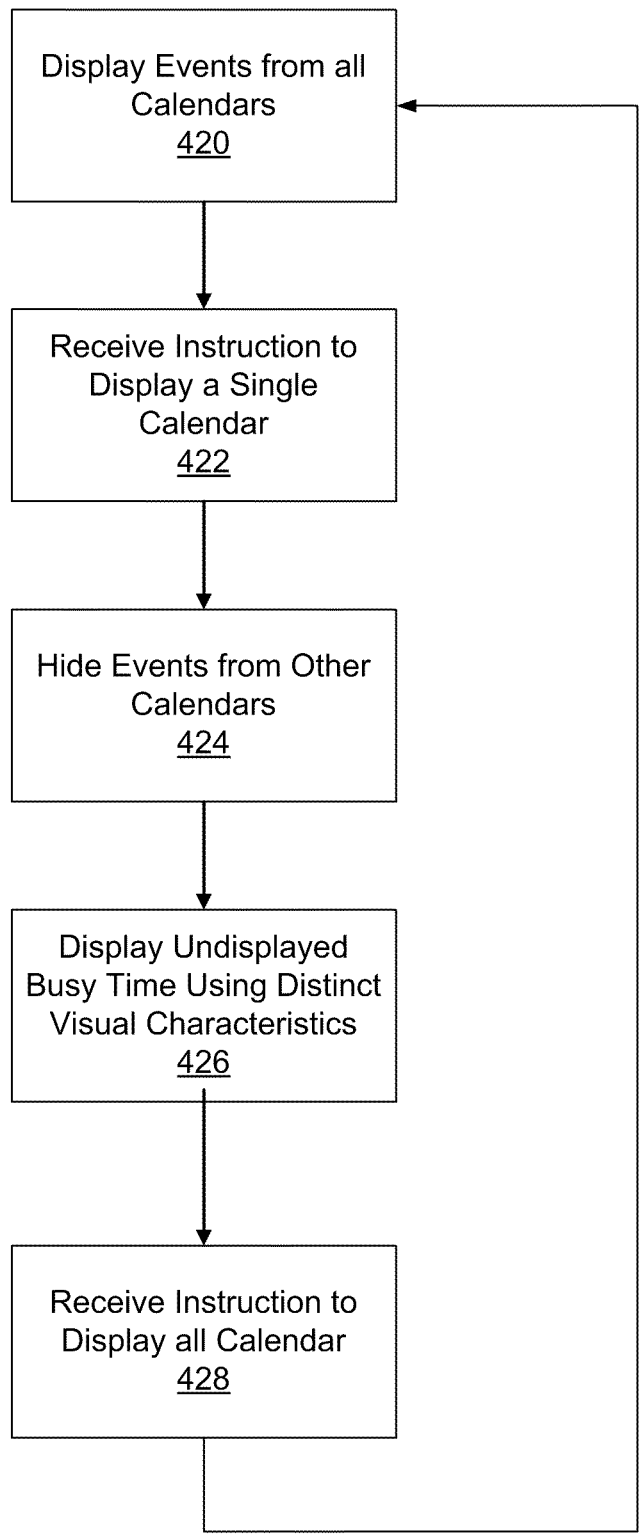

Referring now to FIG. 4B, a flow diagram illustrating one embodiment of an operation of the calendar system 270 to display busy time across all associated calendars (i.e., all-calendar state). As shown, the calendar system 270 displays 420 events extracted from all associated calendars in a calendar grid. The calendar system 270 then receives 422 a user instruction to display a single calendar. For example, the user selects an associated calendar from a dropdown menu listing all the associated calendars. In response, the calendar system 270 hides 424 the events from the unselected calendars (i.e., single-calendar state). The calendar system 270 may display animations that fade out these events and/or optionally widens the display of the remaining events. The calendar system 270 displays 426 the sections of the calendar grid corresponding to the hidden events using different visual features from the free time. If the user wants to find out more about the hidden events, the user may place the calendar system 270 back into the all-calendar state. After receiving 428 such user instruction, the calendar system 270 displays 420 events from all associated calendars. The operation of the calendar system 270 illustrated in FIG. 4B can be implemented as computer program instructions recorded on a computer-readable medium (e.g., the flash memory 214 or the RAM 216) and executable by a processor (e.g., the central processor 220).

Figure 5B:
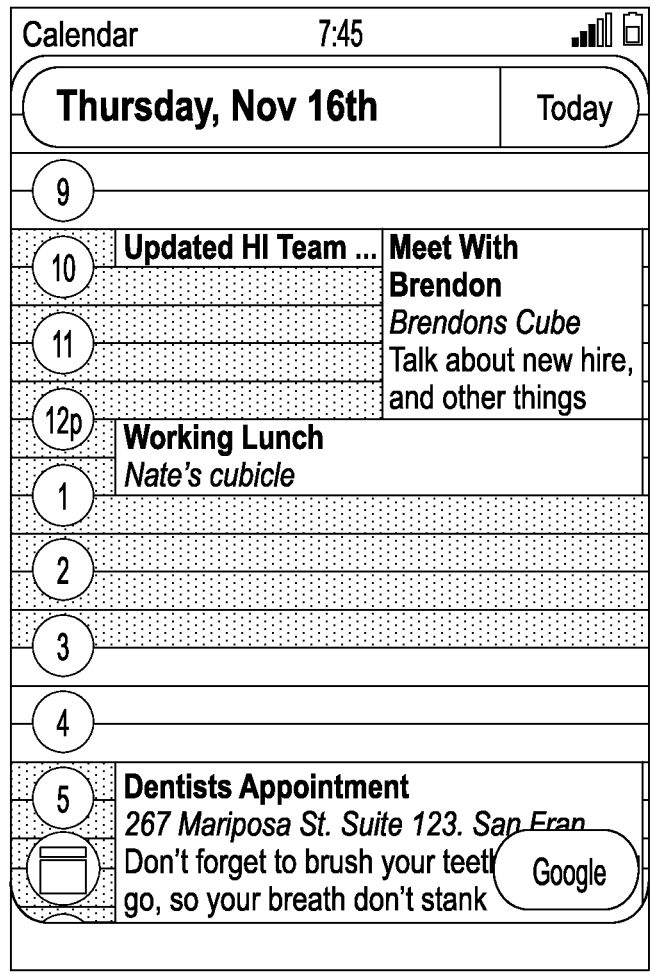

FIG. 5B is a screenshot of the calendar system 270 illustrating the visual distinction between free time and undisplayed busy time according to one embodiment. As shown, the calendar system 270 is in a single-calendar state and only displays events extracted from an associated GOOGLE CALENDAR. Even though no event is displayed for the time period between 1 PM and 3 PM, the corresponding portion of the calendar grid is filled with a visual characteristic, e.g., a strip pattern (or a gray color), that is visually distinctive from the section for free time between 3 PM and 4:30 PM. This visual distinction indicates to the user that, even though not displayed, event(s) is scheduled in other calendar(s) between 1 PM and 3 PM. If the user wants to find out more about the hidden events, the user places the calendar in the all-calendar state. The user can then find out that a trip to an apple farm is scheduled between 12 PM and 3 PM in the MYSPACE CALENDAR, as shown in FIG. 5A.

In one embodiment, responsive to a user attempt to schedule a new appointment during undisplayed busy time, the calendar system 270 displays a dialog box prompting the user with information about the conflicting undisplayed scheduled event(s). For example, the dialog box provides the user with a selectable option to review further information of the conflicting schedule(s). The dialog box may also provide the user with options to reschedule the conflicting calendar entry(s). If the user modifies (e.g., reschedules) a conflicting calendar entry, the calendar system 270 synchronizes with the corresponding online calendar (e.g., through the synchronization module 310) to update the online calendar with the change.

The described configuration beneficially enables a user of the calendar system 270 to view events from one calendar while be reminded of time periods scheduled for events in other associated and undisplayed calendars. Hence, the user saves time and resources by having calendar details from multiple, distinct platforms immediately available within a single application and within a single view that is readily expandable to give more details regardless of the platform on which an event resides.

Time Compression

In one embodiment, in order to efficiently utilize the limited display space on a screen 130 of the mobile computing device 110 and provide users with additional scheduling information, the calendar system 270 compresses the display of extended free time to make room for neighboring events (e.g., through the time compression submodule 352). The user can turn on/off such compressed display. In one embodiment, the calendar system 270 only compresses free time and not undisplayed busy time. In addition, the user can set a minimum threshold for such time compression (e.g., in user preferences). For example, the user can set a 2-hour threshold. According to this threshold, the calendar system 270 would not compress the display for free time that lasts less than 2 hours.

Figure 4C:
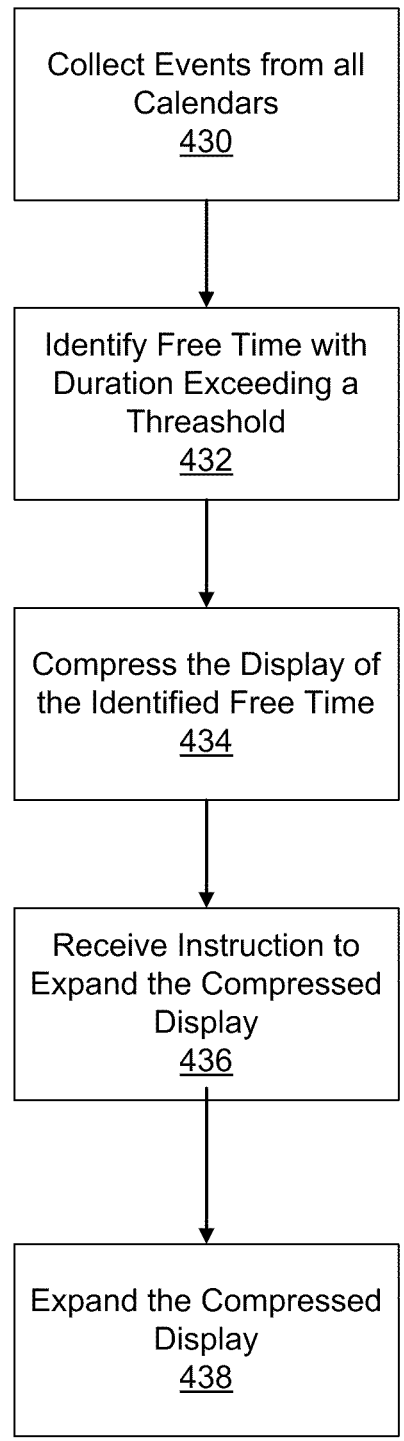

Referring now to FIG. 4C, a flow diagram illustrating one embodiment of an operation of the calendar system 270 (or time compression submodule 352) to compress free time display. As shown, the calendar system 270 is configured to collect 430 events from all associated calendars, and identify 432 free time (i.e., time periods when no event is scheduled in any of the associated calendars) exceeding a threshold (e.g., two hours). The calendar system 270 compresses 434 the display of the identified free time, such that the display only occupies a display area that is otherwise occupied by a shorter period of time (e.g., one hour). Responsive to receiving 436 a user instruction to expand the compressed display, the calendar system 270 expands 438 the display of free time, such that a period of free time would occupy a same display area as a period of busy time with the same duration. In one embodiment, the calendar system 270 compresses and/or expands the display of free time in the virtual display, and displays a portion of the virtual display in the active window. In one embodiment, a user can selectively compress and/or expand the display of a specific period of free time. The operation of the calendar system 270 illustrated in FIG. 4C can be implemented as computer program instructions recorded on a computer-readable medium (e.g., the flash memory 214 or the RAM 216) and executable by a processor (e.g., the central processor 220).

Figure 5C:
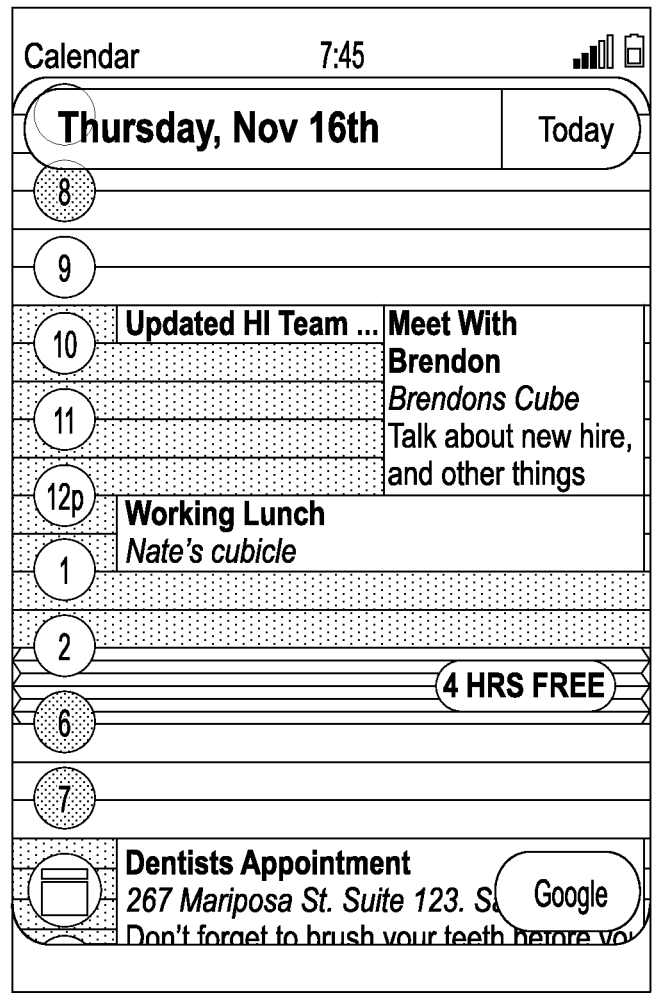

FIG. 5C is a screenshot of the mobile computing device 110 illustrating an example of a calendar grid having a compressed display of free time that lasts 4 hours according to one embodiment. As shown, unlike the rest of the calendar grid, the section representing time between 2 PM and 6 PM is displayed in a wave pattern suggesting that the display is compressed, and occupies a display area that is otherwise occupied by 1 hour. As shown, the calendar system 270 also displays a button on the compressed display, indicating that the free time lasts 4 hours. The user can press the button to turn on/off the compressed display. When the compressed display is turned off, free time is displayed occupying same display area size with busy time of same duration. In one embodiment, the calendar system 270 displays animation to smooth the display transition between a calendar grid with the time compression and without. As indicated by the fill pattern (or gray scale), the adjacent time, 1-2 PM and 6-7:30 PM, even though has no scheduled event displayed, are not free time. Therefore, the calendar system 270 only compresses the free time (2-6 PM), and not the time periods with undisplayed schedules (1-2 PM and 6:7:30 PM).

In one embodiment, in addition to or instead of compressing free time display, the calendar system 270 can similarly compress the display of long-lasting events (e.g., 4-hour meetings).

The feature described above beneficially enables the calendar system 270 to display more scheduled events in limited display space. Moreover, the disclosed configurations optimizes limited display area where there may be extended free time with no event scheduled.

Previewing Transition

The calendar system 270 provides users with multiple levels of calendar view, such as monthly view, weekly view, and daily view, each showing scheduled events in different levels of detail. Higher level views (e.g., monthly view) provide less information about scheduled events than lower level views (e.g., daily view). Users can switch from a higher level view to a lower level view to access more detailed scheduling information. However, view switching tends to interrupt user experiences, especially when the user is uncertain about what period of time to drill down to.

In one embodiment, the calendar system 270 provides a mechanism for a user to preview detailed schedule information unavailable in a calendar view without switching to a lower-level calendar view (e.g., through the preview transition submodule 354). When the user activates the mechanism, the calendar system 270 expands the display for a time period of interest (also referred to as an active time period) and displays detailed information of events scheduled during the active time period. The calendar system 270 reduces the display for the neighboring time periods in the calendar grid to make room for the active time period.

Figure 4D:
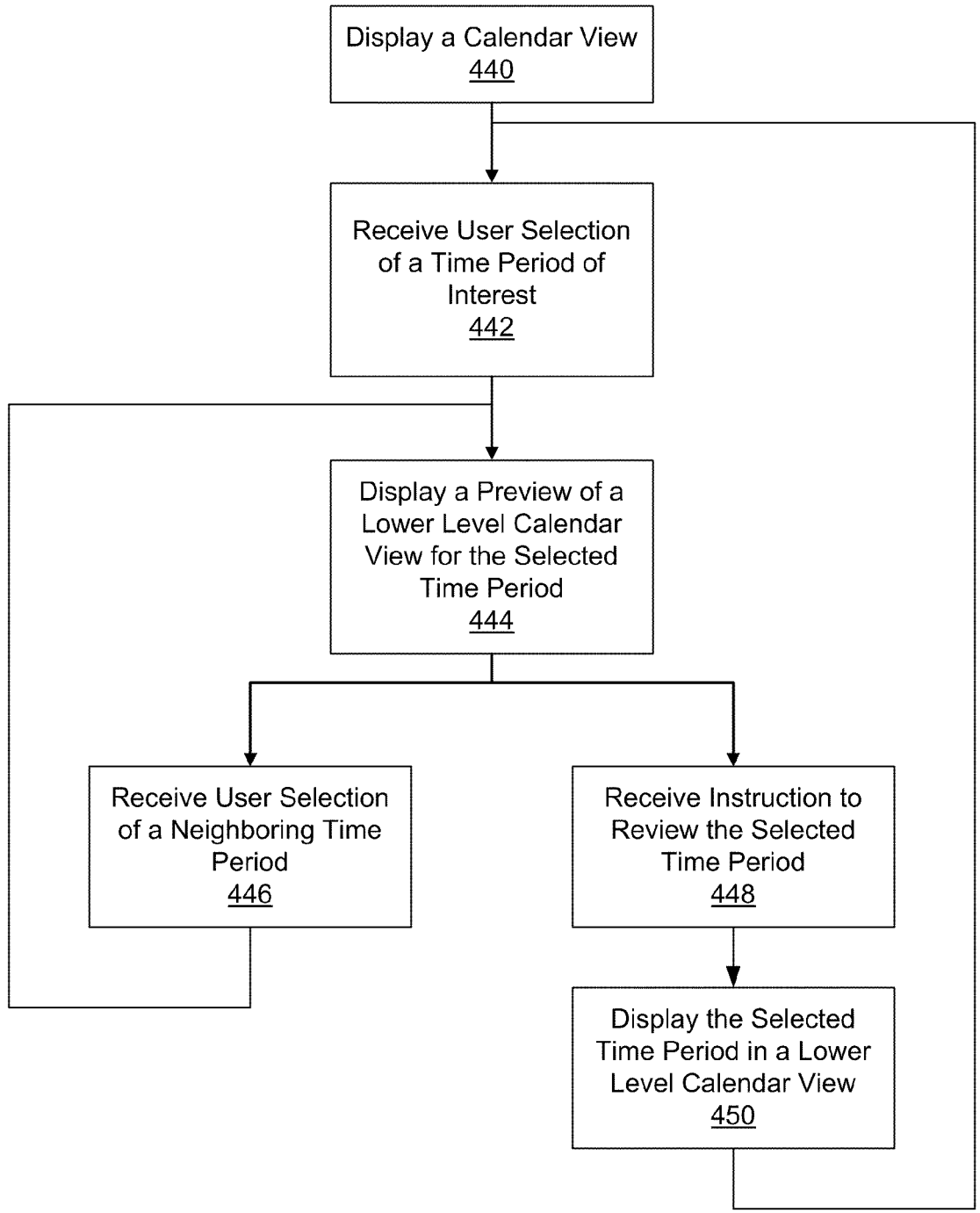
Figures 5D, 5E, 5F:
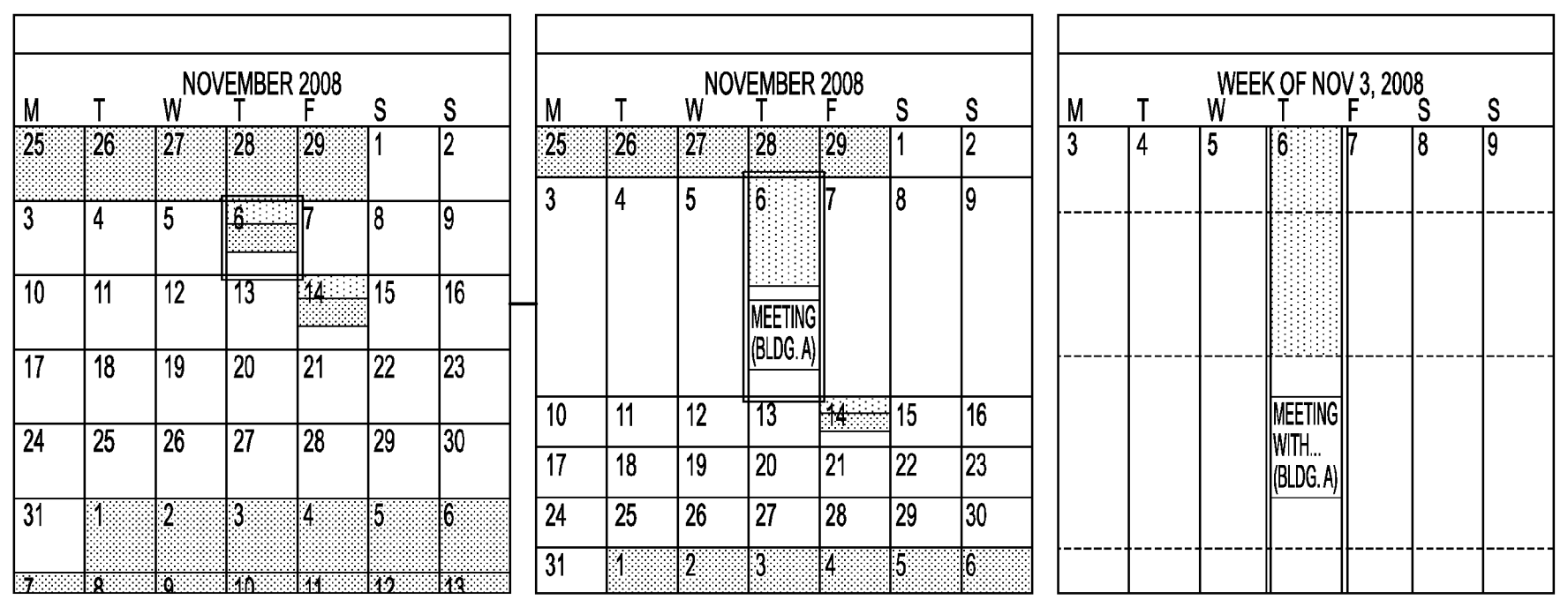

Referring now to FIG. 4D, a flow diagram illustrating one embodiment of an operation of the calendar system 270 (or preview transition submodule 354) to provide the preview transition. As described, the calendar system 270 is configured to display 440 a calendar view containing scheduling information. Reference also will be made to FIG. 5D, which is a screenshot of such a calendar view. As shown in FIG. 5D, the calendar system 270 displays a monthly view of November 2008 with information about schedule events. The display of November 6 includes a gray bar in the middle, indicating that events are scheduled during day time of Nov. 6, 2008. However, the monthly view does not show detailed information of such scheduled events.

Referring back to FIG. 4D, the calendar system 270 receives 442 a user selection of a time period of interest. For example, the user can press, on a touch sensitive display, the display of a time period of interest and hold for a predetermined period of time (e.g., 1 second) to select the time period. In response, the calendar system 270 enters a preview mode and expands the display for the selected time period and displays 444 a preview of more detailed scheduling information during the selected time period. FIG. 5E is a screenshot of the monthly view of November 2008, with the week of November 3-9 displayed in a preview mode. As shown, the display of the selected week is enlarged with scheduling information that is unavailable in the monthly view shown in FIG. 5D. The preview shows that there is a meeting scheduled in the afternoon of November 6 in building A. As shown, the display of the unselected time periods (the week of October 25-November 2, the week of November 10-16, etc.) are reduced to make room for the preview of the selected week.

Referring back to FIG. 4D, while in the preview mode, the calendar system 270 receives 446 user selections of neighboring time periods for preview. For example, the user may navigate the current calendar view in the previewing mode to access detailed scheduling information for neighboring time periods by dragging the user's finger up or down (or left, right) on the touch sensitive display. As a result, the calendar system 270 displays 444 a preview of the selected neighboring time period. The calendar system 270 displays animation to smooth the display transitions involved.

While in the preview mode, the calendar system 270 may also receive 448 a user instruction to review the selected time period. For example, when detecting that the user has released (e.g., from the press-and-hold action or from the dragging up or down action) the touch sensitive display, the calendar system 270 may interpret the release as a user instruction to review the time period currently previewed. In response, the calendar system 270 displays 450 the selected time period in a lower level calendar view with more detailed scheduling information. FIG. 5F is a screenshot of such a display. As shown in FIG. 5F, the calendar system 270 displays a weekly view of the week November 3-9. In one embodiment, the user can choose to resume a normal display of the current calendar view from the preview mode without entering a lower level calendar view (e.g., by activating a button, a switch, etc.). The operation of the calendar system 270 illustrated in FIG. 4D can be implemented as computer program instructions recorded on a computer-readable medium (e.g., the flash memory 214 or the RAM 216) and executable by a processor (e.g., the central processor 220).

The feature described above beneficially enables a user of the calendar system 270 to view detail schedule information that is otherwise unavailable in a calendar view without leaving the calendar view. Moreover, the calendar system 270 is configured to quickly zoom into details while retaining visual continuity.

Scrolling Time View

Users can view schedules using the various calendar views (e.g., monthly view, weekly view, daily view, etc.) provided by the calendar system 270. Typically calendar views allow users to browse time as pages. For example, a user can browse events scheduled during a particular month through a monthly view, and can either move forward to access schedules of the next month (next page) or move backward to the month before (previous page). However, events often do not conform to the arbitrary boundaries of weeks and months. For example, vacations often start in one month and end in another. As a result, users are unable to view their complete schedules at once without switching (e.g., zooming out) to a different and often undesirable calendar view.

In one embodiment, the calendar system 270 provides a mechanism for a user to flexibly view time as a scrolling list not subject to arbitrary calendar unit boundaries such as weeks and months. Instead of navigating time as pages in a calendar view (e.g., from one Sunday-Saturday period to the next Sunday-Saturday in a weekly view), the user can scroll the display to any time period in between (e.g., from Sunday-Saturday to Tuesday-Monday, Wednesday-Tuesday, etc.). As a result, the user can flexibly navigate to a time period of interest without being restricted by the arbitrary calendar unit boundaries set by the calendar views. For example, in a monthly view, the user can scroll the displayed calendar grid vertically to display the schedule of an undisplayed neighboring week. As another example, in a weekly view, the user can scroll the displayed calendar grid horizontally to display the schedule of an undisplayed neighboring day. As a result, the user can conveniently navigate to the time period of interest.

In addition, the calendar system 270 can be configured to prioritize the display of the future or the display of the past. For example, if the user desires to view future schedules over the past, then the user can set a preference causing the calendar system 270 to display more time into the future than the past, disregarding today's relative position in the relevant calendar units. For example, if a current day is September 30, rather than showing the month of September, the calendar system 270 shows the week of September 30 and all of the month of October. As a result, September 30 gets snapped to top of screen rather than being displayed at the bottom. A user may also set the preference to prioritize the display of the past, or the display of the neighboring days (e.g., display the two weeks immediately before and after the current day in a monthly view).

Figure 4E:
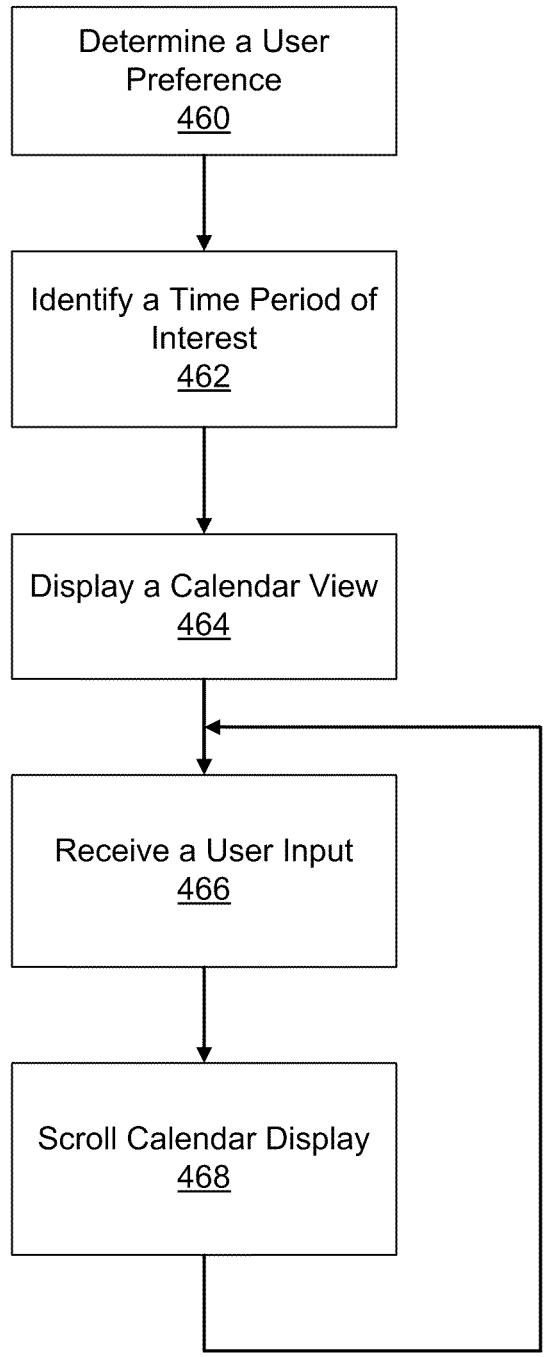

Referring now to FIG. 4E, a flow diagram illustrating one embodiment of an operation of the calendar system 270 (or scrolling view submodule 356) to provide the scrolling time view feature. As shown, the calendar system 270 is configured to determine 460 a user preference of time priority. As described above, a user may desire to look more into the future or the past. The calendar system 270 determines the user's desire by way of user preference set by the user. The calendar system 270 identifies 462 a time period of interest based on the current calendar view and the user preference and displays 464 the scheduling information of the time period on the calendar view. The operation of the calendar system 270 illustrated in FIG. 4E can be implemented as computer program instructions recorded on a computer-readable medium (e.g., the flash memory 214 or the RAM 216) and executable by a processor (e.g., the central processor 220).

Figure 5H:
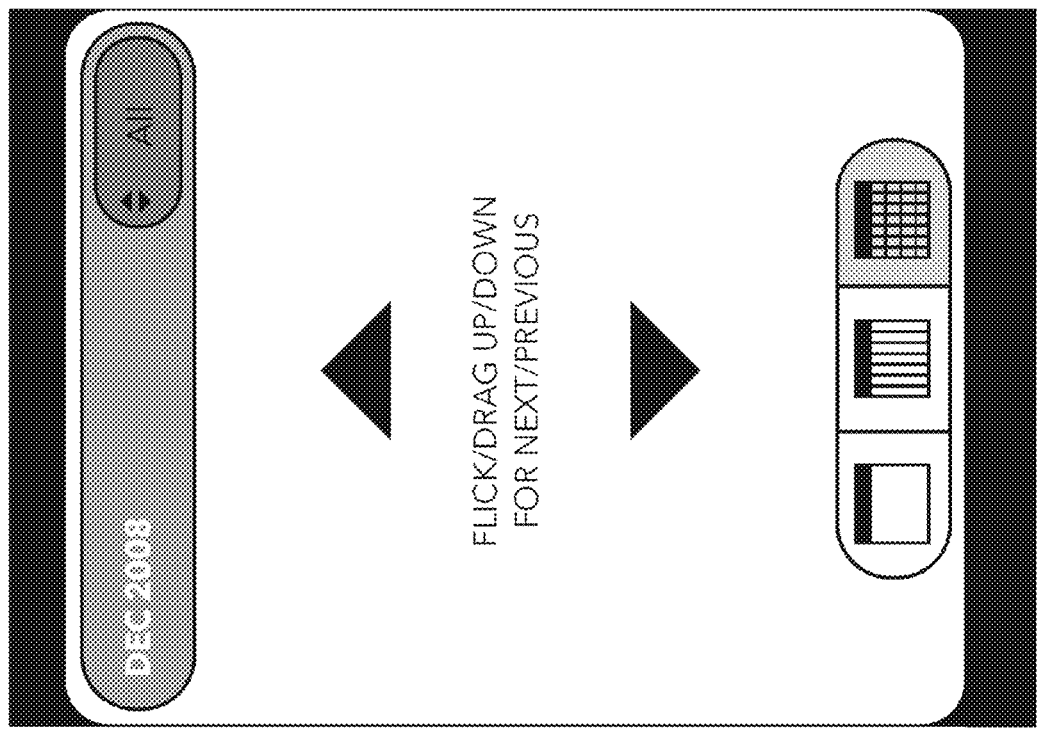
Figure 5G:
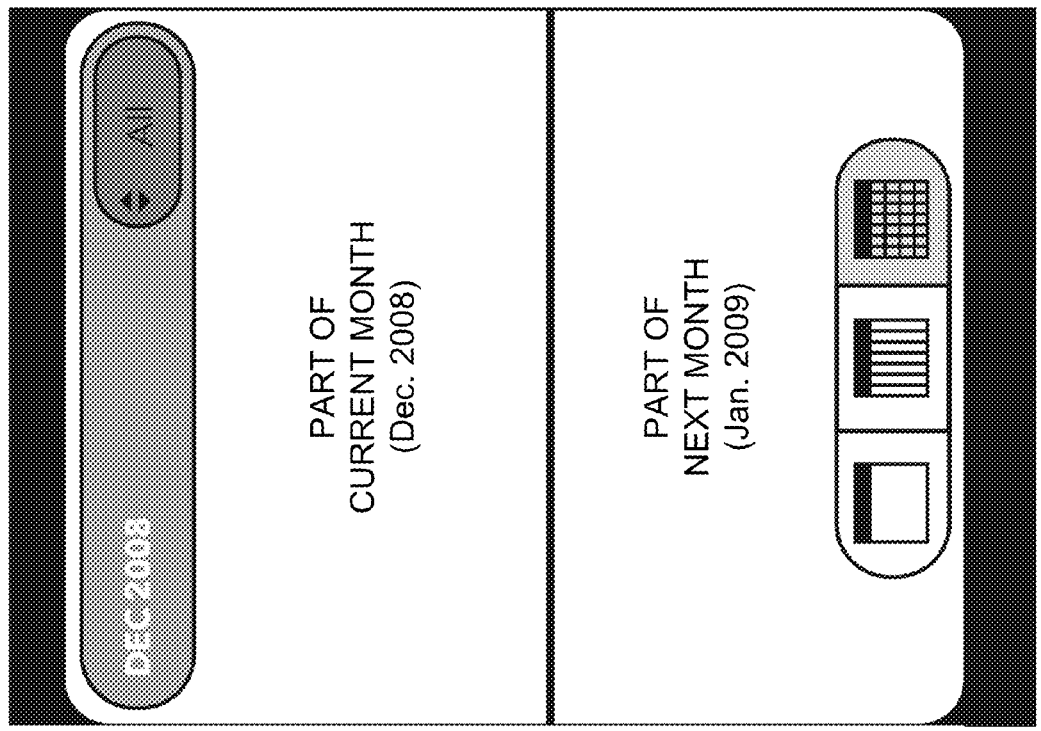

FIG. 5G is a screenshot of a monthly view of a calendar that displays more scheduling information in the future than the past. As shown, the monthly view displays part of the current month (e.g., December 2008) and part of the upcoming month (e.g., January 2009). Assume today is Wednesday, Dec. 17, 2009, and the user preference indicates a desire to view scheduling information in the future. The calendar system 270 determines 460 the user preference, identifies 462 a time period (e.g., Sunday, Dec. 14, 2008 to Saturday, Jan. 17, 2009), and displays 464 part of December 2008, and part of January 2009, as illustrated in FIG. 5G.

Referring back to FIG. 4E, the calendar system 270 receives 466 a user input to scroll the calendar display, and scrolls 468 the calendar display in a direction indicated by the user input to display additional scheduling information. The user can navigate the calendar display as a scrolling list conveniently using input devices such as a touch-sensitive display. For example, the user can use gestures (e.g., sliding a finger on the display) to scroll the calendar display. The gesture speed may control a scrolling speed. The user can also control the display through mechanisms such as soft buttons displayed on the touch-sensitive display, a roller ball, the navigation ring 145, an accelerometer, a joystick, and any other input device.

Continue with the example illustrated above with relate to FIG. 5G, the user can drag a finger up or down on the touch sensitive display to scroll the calendar display as indicated by the two arrows 560A, 560B shown on the screenshot of FIG. 5H. For example, the user can choose to scroll up the calendar display to display the schedule of the month of December, 2008, as shown in the screenshot of FIG. 5H.

The user can use the control to move a calendar control (e.g., a current day) and invoke additional features. For example, the user can use the control to point to a place where the calendar system 270 displays detailed scheduling information (i.e., amplifier lens). The control can be configured to simulate an analog mode such that the calendar system 270 gradually displays the newly displayed time period. The calendar system 270 may cache scheduling data for a period of time to reduce database transactions. The cache period may be refined or adjusted based on user behavior.

Figure 5J:
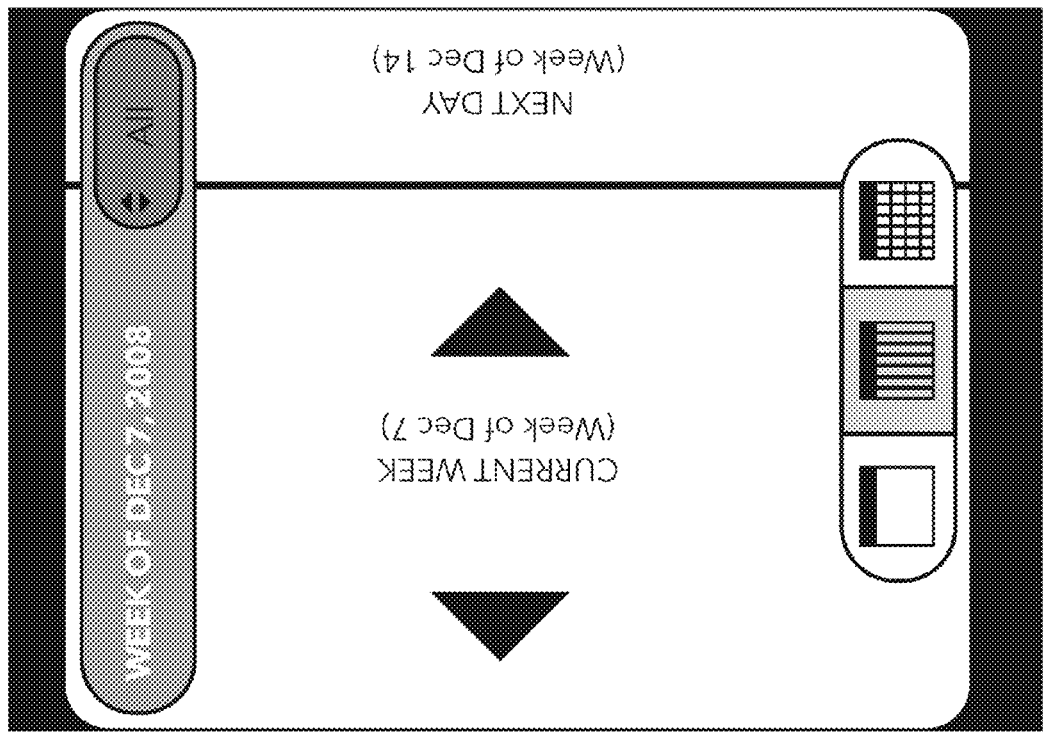
Figure 5I:
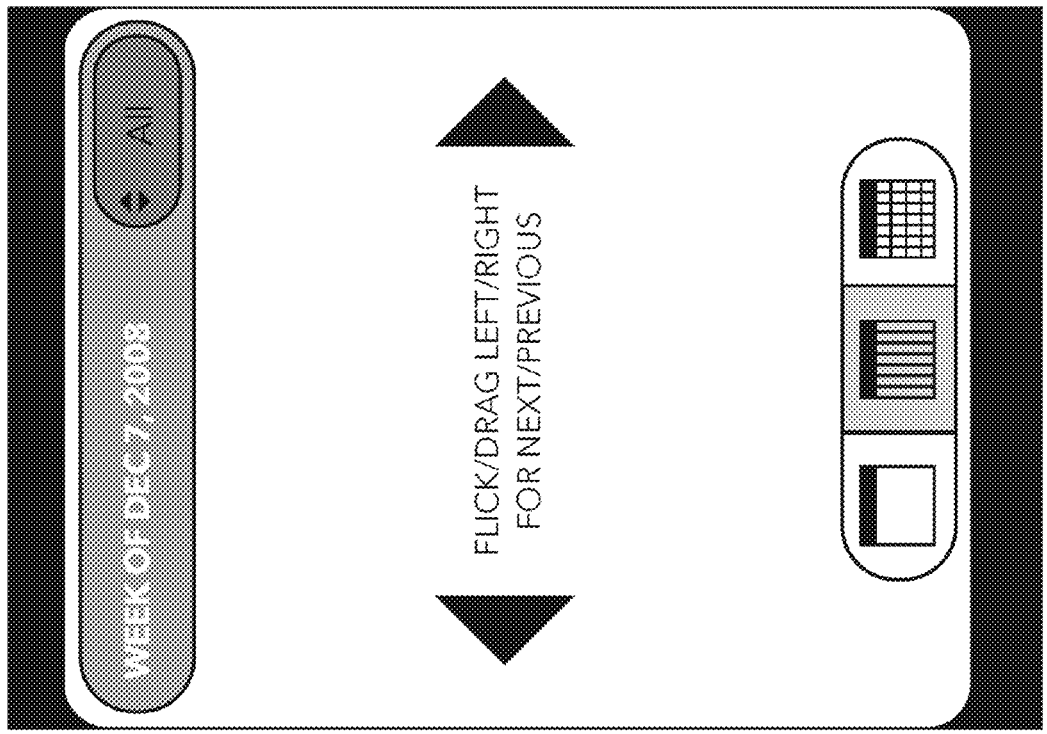
Figure 5L:
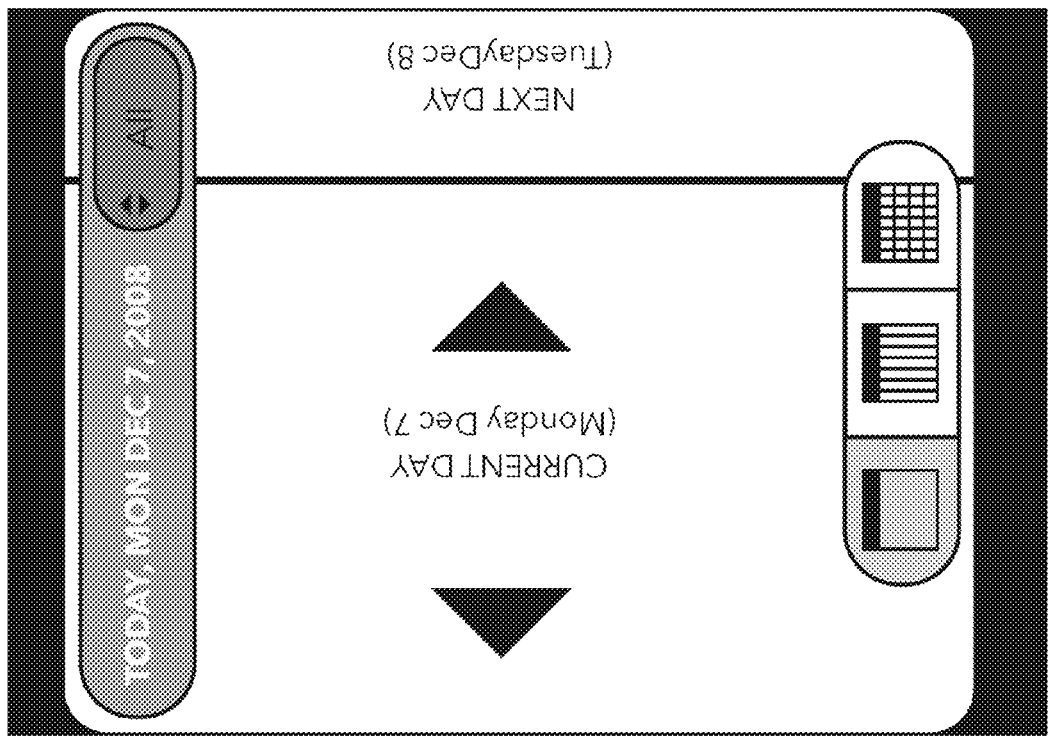
Figure 5K:
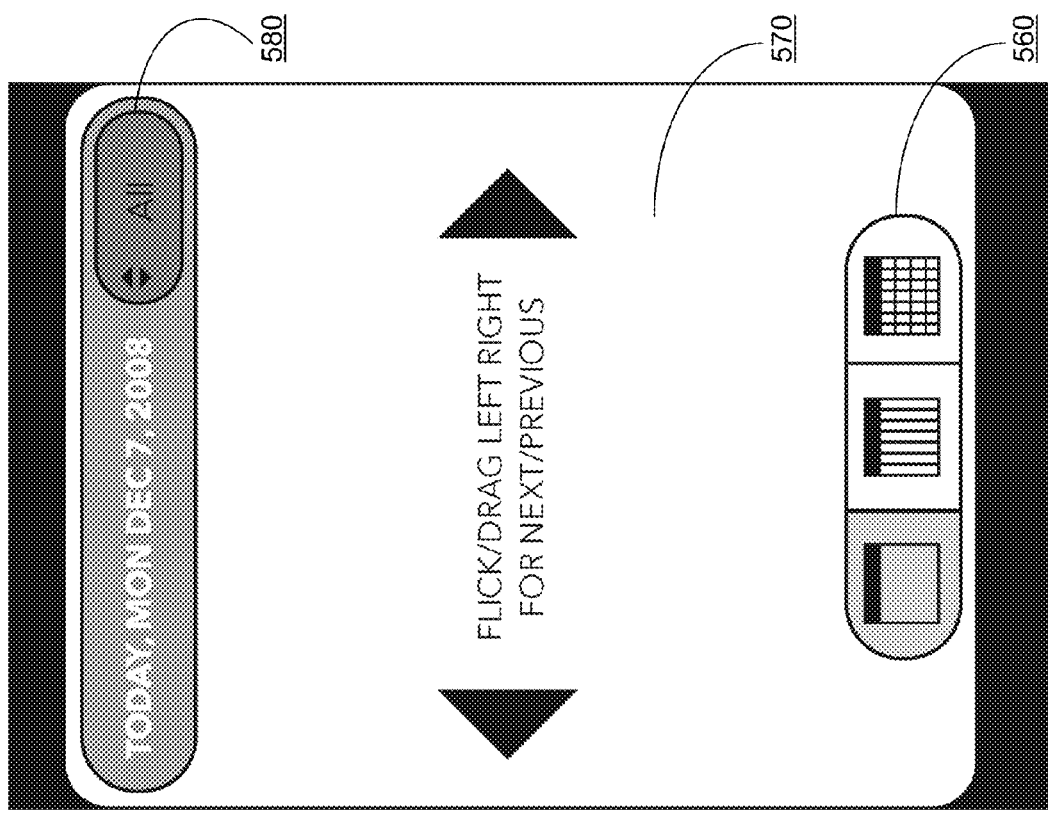

Additional example user experiences of scrolling time view are illustrated in screenshots of FIGS. 5I-5L. FIG. 5I is a screenshot illustrating a weekly calendar view of the week of Dec. 7, 2008. The user can drag or flick the display to scroll left or right as desired. FIG. 5J is a screenshot of the weekly view after the user scroll rightward to view scheduling information of the future. FIG. 5K is a screenshot illustrating a daily calendar view of Monday, Dec. 7, 2008. The user can scroll the display to the left or to the right to see the scheduling information of the day before or after. As illustrated in the screenshot of FIG. 5L, the user can stroll the daily view right-ward to view the scheduling information of the next day, Thursday, Dec. 8, 2008. As shown, the screenshots have a view switcher 590. The user can switch among the daily view, the weekly view, and the monthly view by selecting the corresponding icon on the view switcher 590.

The feature described above beneficially enables a user of the calendar system 270 to view a schedule as a scrolling list not subject to the arbitrary calendar units (e.g., month, week, day), such that the user can conveniently scroll the displayed calendar to a window of time that the user cares about. Moreover, the calendar system 270 prioritizes the display of the past/future based on a user preference.

ADDITIONAL EMBODIMENTS

In one embodiment, a server external to the mobile computing device 110 retrieves calendar information from calendars of multiple calendar platforms, extracts event information, aggregates the extracted events, and maintains an aggregated calendar. The mobile computing device 110 communicates with the server to access and synchronize calendar entries.

Some portions of above description describe the embodiments in terms of algorithms and symbolic representations of operations on information. For example, the descriptions of FIGS. 2, 3, and 4A-4E (and corresponding views illustrated and described with FIGS. 5A-5L). These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like and are executable by a processor (e.g., the central processor 220 of the mobile computing device 110). Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for accessing and managing calendars on a mobile computing device through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for displaying calendar entries on a display of a computing device, the method being performed by one or more processors and comprising:

providing a calendar unit having individual time slots each representing a fixed duration of time on the display of the computing device, the calendar unit including a first section and a second section, wherein (i) the first section comprises a first time period and includes multiple fixed durations of time in which no calendar entries are scheduled, the first section being compressed in size to a single individual time slot, and (ii) the second section comprises a plurality of time slots and includes one or more calendar entries that are scheduled during a second time period, and wherein the first section is displayed in a pattern that is visually distinctive from a pattern of a respective calendar entry in the second section;

providing, in the first section, a selectable feature that identifies the first time period, wherein the selectable feature enables the first section to expand in size without expanding the respective calendar entry when a user selects the selectable feature; and in response to the user selecting the selectable feature, expanding the first section on the calendar unit without expanding the respective calendar entry such that each of the multiple fixed durations of time expands into an individual time slot.

2. The method of claim 1, wherein the first section is compressed in size in response to determining that the first time period exceeds a threshold duration.

3. The method of claim 1, wherein the calendar unit represents a day, multiple days, or a week.

4. The method of claim 1, wherein expanding the first section on the calendar unit includes providing an animation of the first section expanding.

5. The method of claim 1, wherein the display is a touch-sensitive display, and wherein the user selects the selectable feature by making contact with the touch-sensitive display.

6. The method of claim 1, further comprising:
receiving a user selection of the respective calendar entry; and
in response to receiving the user selection of the respective calendar entry, enabling the user to view or modify the respective calendar entry.

7. A computing device comprising:
a touch-sensitive display; and
a processor coupled to the touch-sensitive display, the processor to:
provide a calendar unit having individual time slots each representing a fixed duration of time on the touch-sensitive display, the calendar unit including a first section and a second section, wherein (i) the first section comprises a first time period and includes multiple fixed durations of time in which no calendar entries are scheduled, the first section being compressed in size to a single individual time slot, and (ii) the second section comprises a plurality of time slots and includes one or more calendar entries that are scheduled during a second time period, and wherein the first section is displayed in a pattern that is visually distinctive from a pattern of a respective calendar entry in the second section; and
provide, in the first section, a selectable feature that identifies the first time period, wherein the selectable feature enables the first section to expand in size without expanding the respective calendar entry when a user selects the selectable feature; and
in response to the user selecting the selectable feature, expand the first section on the calendar unit without expanding the respective calendar entry such that each of the multiple fixed durations of time expands into an individual time slot.

8. The computing device of claim 7, wherein the processor compresses the first section in response to determining that the first time period exceeds a threshold duration.

9. The computing device of claim 7, wherein the calendar unit represents a day, multiple days, or a week.

10. The computing device of claim 7, wherein the processor expands the first section on the calendar unit by presenting an animation of the first section expanding.

11. The computing device of claim 7, wherein the user can select the selectable feature by making contact with the touch-sensitive display.

12. The computing device of claim 7, wherein in response to a user selection of the respective calendar entry, the processor enables the user to view or modify the respective calendar entry.

13. A non-transitory computer readable medium storing instructions, that when executed by one or more processors, cause the one or more processors to perform steps comprising:
providing a calendar unit having individual time slots each representing a fixed duration of time on a display of the computing device, the calendar unit including a first section and a second section, wherein (i) the first section comprises a first time period and includes multiple fixed durations of time in which no calendar entries are scheduled, the first section being compressed in size to a single individual time slot, and (ii) the second section comprises a plurality of time slots and includes one or more calendar entries that are scheduled during a second time period, wherein the first section is displayed in a pattern that is visually distinctive from a pattern of a respective calendar entry in the second section; and
providing, in the first section, a selectable feature that identifies the first time period, wherein the selectable feature enables the first section to expand in size without expanding the respective calendar entry when a user selects the selectable feature; and
in response to the user selecting the selectable feature, expanding the first section on the calendar unit without expanding the respective calendar entry such that each of the multiple fixed durations of time expand into an individual time slot.

14. The non-transitory computer readable medium of claim 13, further storing instructions that causes the one or more processors to expand the first section on the calendar unit by presenting an animation of the first section expanding.

15. The non-transitory computer readable medium of claim 13, further storing instructions that causes the one or more processors to:
in response to receiving a user selection of the respective calendar entry, enable the user to view or modify the respective calendar entry.

\* \* \* \* \*